(12) United States Patent
Hong et al.

(10) Patent No.: US 6,528,445 B1
(45) Date of Patent: Mar. 4, 2003

(54) DIELECTRIC CERAMIC COMPOSITION AND METHOD FOR MANUFACTURING THE SAME

(75) Inventors: Kug Sun Hong, 11-1502, Sampoong Apt., Seocho 4-dong, Seocho-ku, Seoul 137-074 (KR); Jung-Kun Lee, Seoul (KR); Dong-Wan Kim, Seoul (KR); Hyun-Woo Jung, Masan (KR); Jeong-Ryeol Kim, Seongnam (KR); Sang-Gu Kang, Jeonju (KR); Do-Kyun Kwon, Seoul (KR)

(73) Assignee: Kug Sun Hong, Seoul (KR)

( * ) Notice: Subject to any disclaimer, the term of this patent is extended or adjusted under 35 U.S.C. 154(b) by 0 days.

(21) Appl. No.: 09/765,577

(22) Filed: Jan. 22, 2001

(30) Foreign Application Priority Data

Nov. 17, 2000 (KR) .......................... 2000-68493

(51) Int. Cl.⁷ .................. C04B 35/495; C04B 35/49
(52) U.S. Cl. .................. 501/137; 501/136; 501/138
(58) Field of Search .................. 501/136, 137, 501/138

(56) References Cited

U.S. PATENT DOCUMENTS

| | | | |
|---|---|---|---|
| 4,767,732 A | 8/1988 | Furukawa et al. | 501/137 |
| 4,987,107 A | 1/1991 | Narumi et al. | 501/137 |
| 5,264,402 A | 11/1993 | Sano et al. | 501/137 |
| 5,350,639 A | 9/1994 | Inoue et al. | 428/633 |
| 5,512,524 A * | 4/1996 | Nagas et al. | 501/139 |
| 6,316,376 B1 | 11/2001 | Hong et al. | 501/138 |

OTHER PUBLICATIONS

Sebastian, M.T., "New low loss microwave dielectric ceramics in the $BaO_2-Nb_2)_5/Ta_2O_5$ system," *Journal of Materials Science: Materials In Electronics 10* (1999), pp 475–478.

Takada, T. et al., "Effects of Glass Additions on $(Zr,Sn)TiO_4$ for Microwave Applications," *J.Am. Ceram. Soc. 77[9]* (1994), pp 2485–2488.

Takada, T. et al., "Effect of Glass Additions on $BaO-TiO_2-WO_3$ Microwave Ceramics," *J. Am. Ceram. Soc. 77[7]* (1994), pp 1906–1916.

Yamamoto, H. et al., "Low–Temperature Firing of $MgTiO_3-CaTiO_3$ Microwave Dielectric Ceramics Modified with $B_2O_3$ or $V_2O_5$," *J. Ceram. Soc. Of Japan, 106[3]* (1998), pp. 339–343.

Kagata, H. et al., "Low–Fire Bismuth–Based Dielectric Ceramics for Microwave Use," *Jpn. J. Appl. Phys., 31,* (1992), pp. 3152–3155.

* cited by examiner

*Primary Examiner*—C. Melissa Koslow
(74) *Attorney, Agent, or Firm*—Shanks & Herbert

(57) ABSTRACT

Disclosed is a dielectric ceramic composition suitable for use in planar or multilayer type electronic parts containing inner conductors, for the fabrication of which simultaneously sintering base materials and conductors is required. This ceramic composition is composed of $(1-x)Ba_3Ti_4Nb_4O_{21}-(x)Ba(\text{or } Sr)Nb_2O_6 (0<x<1)$

21 Claims, No Drawings

DIELECTRIC CERAMIC COMPOSITION AND METHOD FOR MANUFACTURING THE SAME

This application claims priority to Republic of Korea patent application 2000-68493 filed Nov. 17, 2000.

BACKGROUND OF THE INVENTION

1. Field of the Invention

The present invention relates, in general, to a dielectric ceramic composition and, more particularly, to a dielectric ceramic composition controllable in temperature coefficient of resonant frequency and sinterable at low temperatures, suitable for use in planar or multilayer type electronic parts containing inner conductors, for the fabrication of which simultaneously sintering base materials and conductors is required. Also, the present invention is concerned with a method for manufacturing such a dielectric ceramic composition.

2. Description of the Prior Art

With great advances in electronic and communication technologies, apparatuses and equipments for embodying them have recently been miniaturized. To this miniaturization, stacking and chipping techniques of electronic parts make a great contribution. Generally, ceramic materials for use in electronic parts are divided into dielectrics and magnetics. Recently, particular pressure has been placed on electronic parts made of dielectrics to miniaturize.

Representative of the electronic parts to which stacking techniques are applied is a capacitor. Examples of multilayer type electronic parts for use in mobile communication terminals include filters, couplers, duplexers, oscillators and multichip modules (MCM). The multilayer type electronic parts, most portions of which are formed of multiplayer dielectrics and inner electrodes, are fabricated by laminating a dielectric into a tape, printing an inner electrode onto the dielectric laminate, stacking a plurality of laminates and firing the stack.

To be useful for multilayer type elements, accordingly, dielectrics must be capable of being sintered along with electrodes in addition to having dielectric properties suitable for application. Such dielectric requirements include high dielectric constant, low dielectric loss, and low dependency of resonant frequency modulation on temperature change and the like.

Materials suitable for the inner electrodes are silver, copper, nickel, palladium, platinum, gold and alloys thereof. Selection of one of the inner electrode materials is made depending on the sintering temperature and properties of the ceramic dielectric used and vice versa.

For example, silver (Ag), showing the lowest specific resistance ($1.62 \times 10^{-4}$ Ωcm) and being inexpensive, cannot be applied to ceramic dielectrics which must be sintered at 950° C. or higher because of its low melting point (961° C.). In spite of their high melting points, gold (Au), platinum and palladium (Pd) are restricted in their use because of high price. As for copper (Cu) or nickel (Ni) electrodes, their very poor oxidation resistance requires sintering at an oxygen partial pressure as low as about $10^{-9}$ atm, causing the problem that, when thermally treated under such a low oxygen partial pressure, most dielectric ceramic compositions show highly increased dielectric loss and thus cannot be used as capacitors.

Ceramic dielectric compositions currently used in multilayer type electronic parts are, for the most part, based on $BaTiO_3$, optionally added with oxide sintering aids or glass frits for reduction of sintering temperatures. Typically, these dielectric compositions range, in sintering temperature, from 1,100 to 1,300° C., as well as being resistant to reduction and having dielectric constants of several hundreds or higher. However, their great dielectric loss makes it difficult to apply them to the products which are used for high frequency band of MHz or higher. Additionally, the dielectric compositions suffer from the drawback of undergoing a dielectric constant fluctuation of as large as hundreds ppm/° C., which prevents them from being applied to temperature-stable capacitors or electronic parts for mobile communication.

Dielectric compositions known to be usable for multilayer type elements operable with frequencies of MHz or higher are exemplified by Cuo or $V_2O_5$-added $BiNbO_4$ and glass-added (Mg, Ca)$TiO_3$, (Zr, Sn)$TiO_4$ or (BaO—$TiO_2$—$WO_3$). These compositions, however, have drawbacks of being not effectively sintered at a temperature lower than 1,000° C., being poor in dielectric properties at microwave frequencies, and showing large reactivity with electrode materials.

Another well-known dielectric composition is based on a BaO—$TiO_2$—$Nb_2O_5$ system, whose subtypes comprise $BaTiNb_4O_{13}$, $Ba_3Ti_4Nb_4O_{21}$ and $Ba_3Ti_5Nb_6O_{28}$ (see. "New low microwave dielectric ceramics in the BaO—$TiO_2$—$Nb_2O_5$/$Ta_2O_5$ system", M. T. Sebastian, Journal of Materials Science; Materials in Electronics, Vol. 10 (1999), pp. 475–478). U.S. Pat. No. 4,767,732 discloses a high dielectric constant ceramic material having a high dielectric constant and a high insulation resistance obtained by mixing $BaTiO_3$ powder and oxides of Pb, Ba, Sr, Zn, Nb, Mg and Ti. These compositions $Ba_3Ti_4Nb_4O_{21}$ and $BaTiO_3$, in spite of having a dielectric constant and a quality factor (Q×f) amounting to as large as 55 and 9,500, respectively, is virtually impossible to apply to electronic parts which require high frequencies of microwave bands or high temperature stability for their operation because its temperature coefficient of resonant frequency is 100 ppm/° C. Furthermore, this publication does not describe low-temperature sintering properties of the composition.

SUMMARY OF THE INVENTION

With the problems encountered in prior arts in mind, the present invention has an object of providing a dielectric ceramic composition, which is controllable in temperature coefficient of resonant frequency and sinterable at low temperatures.

It is another object of the present invention to provide a dielectric ceramic composition with excellent dielectric properties suitable for use in planar or multilayer type elements operable with frequencies from MHz to GHz.

It is a further object of the present invention to provide a method for manufacturing such a dielectric ceramic composition.

Based on the present invention, there is provided a ceramic Composition comprising as a main component a compositions represented by

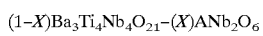
$(1-X)Ba_3Ti_4Nb_4O_{21}-(X)ANb_2O_6$ wherein, X is a mole fraction between 0 and 1; and A is Ba or Sr.

A is Ba or Sr.

According to one aspect of the invention, the ceramic composition may further comprise at least one oxide selected from the group consisting of $B_2O_3$, CuO and ZnO, and or alternatively at least one additive selected from the group consisting of $V_2O_5$, $SnO_2$, MgO, NiO, $Sb_2O_3$, $Bi_2O_3$ and $Ag_2O$.

The present invention further provides a method for manufacturing a dielectric ceramic, comprising the steps of: mixing oxide powders to give a composition composed of $(1-x)Ba_3Ti_4Nb_4O_{21}-(x)Ba(\text{or Sr})Nb_2O_6$; drying and calcining the composition; milling the calcinated composition; molding the milled composition to give a molded body; and sintering the molded body.

In another aspect of the present invention, the process may further comprise the steps of adding the sintering aids and/or additive to the composition before calcination.

DETAILED DESCRIPTION OF THE INVENTION

The present invention contemplates a composite dielectric ceramic composition suitable for use in microwave bands, comprising two separate ingredients with different temperature coefficients of resonant frequency, one being of negative temperature coefficient of resonant frequency, the other of positive. As a dielectric ceramic with a negative dielectric constant, $Ba_3Ti_4Nb_4O_{21}$ is used in the present invention. The other ceramic useful in the present invention is composed of $BaNb_2O_6$ or $SrNb_2O_6$. Optionally, the composite dielectric ceramic composition comprises a sintering aid selected from the group consisting of $B_2O_3$, CuO and ZnO.

A temperature of as high as 1,200° C. is needed to sinter the $Ba_3Ti_4Nb_4O_{21}$—Ba(or Sr)$Nb_2O_6$-based composition (sometimes, "base composition"), basically excluding the possibility of sintering a low-melting point metal electrode, such as silver, copper or silver/palladium alloy, together. The sintering aid acts to reduce the sintering temperature of the base composition to 900–1,000° C., making it possible to use such a low-melting point metal electrode.

A preferable amount of the sintering aid falls within the range of 0.01–7 weight parts of the base composition. For example, when the sintering aid is used at such an amount, the sintering can be facilitated and the composition can be improved in dielectric properties. On the other hand, when the amount of the sintering aid is outside the preferred range, no improvements can be expected in either the sintering or the dielectric properties of the composition.

Besides the sintering aid, the $Ba_3Ti_4Nb_4O_{21}$—Ba(or Sr)$Nb_2O_6$-based composition according to the present invention may comprise at least one oxide additive selected from the group consisting of $V_2O_5$, $SnO_2$, MgO, NiO, $Sb_2O_3$, $Bi_2O_3$ and $Ag_2O$. This oxide additive is preferably added in an amount of 0.01–7 weight parts of the base composition. Within this range, the additive acts to improve sintering properties of the base composition.

To improve dielectric properties, the $Ba_3Ti_4Nb_4O_{21}$ moiety of the base composition may be partially substituted with cationic substituents such as $SnO_2$, $ZrO_2$ or $Ta_2O_5$. The presence of such cationic substituents in the $Ba_3Ti_4Nb_4O_{21}$ moiety brings about advantages of reducing the dielectric loss and modulating the temperature coefficient of resonant frequency. When the $TiO_2$ of the $Ba_3Ti_4Nb_4O_{21}$ moiety is partially substituted with $SnO_2$ or $ZrO_2$ a preferable amount of these substituent oxides fall within the range of 0.01–50 mol %. For instance, if too much or too little $SnO_2$ or $ZrO_2$ is added, it can cause an increase in either the dielectric loss or the temperature coefficient of resonant frequency. $Ta_2O_5$ is used to substitute Ta for the Nb of the $Ba_3Ti_4Nb_4O_{21}$. The substituting amount of Ta is preferably within the range of 0.01–50 mol %. If the amount of Ta is outside of this range, deterioration is found in the sintering properties of the composition.

Below, a description will be given of the manufacturing process of the ceramic dielectrics according to the present invention.

The composition of $(1-x)Ba_3Ti_4Nb_4O_{21}-(x)Ba(\text{or Sr})Nb_2O_6$ may be prepared from materials composed of $Ba_3Ti_4Nb_4O_{21}$ or its cation-substituted material, and materials composed of Ba(or Sr)$Nb_2O_6$.

Thus, a material composed of $Ba_3Ti_4Nb_4O_{21}$ or its cation-substituted material, and a material composed of Ba(or Sr)$Nb_2O_6$ are separately prepared, followed by mixing the two compositions at an appropriate mole ratio to give a base composition with a suitable temperature coefficient of resonant frequency. By virtue of its superior microwave characteristics, the base composition can be directly applied to multilayer type electronic parts for high frequencies.

Optionally, the base composition may further comprise sintering aids and/or additives in order to improve its low-temperature sintering properties.

To the $Ba_3Ti_4Nb_4O_{21}$—Ba(or Sr)$Nb_2O_6$ -based composition is added at least one oxide selected from the group consisting of $B_2O_3$, CuO and ZnO, as sintering aid in an amount described above. Otherwise, the oxides can be added prior to or during the step of mixing the material composed of $Ba_3Ti_4Nb_4O_{21}$ or its cation-substituted material and the material composed of Ba(or Sr)$Nb_2O_6$.

Thus obtained mixture is demoisturized. After calcination, the demoisturized mixture is milled. Addition of a binder enables the resulting powder to be molded and sintered to yield a dielectric. During this procedure, the oxide serves as a sintering aid for improving the low-temperature sintering properties.

Besides the sintering aid, the composition may further comprises at least one additive selected from the group consisting of $V_2O_5$, $SnO_2$, MgO, NiO, $Bi_2O_3$, $Ag_2O$ and $Sb_2O_3$ for similar purposes, which may be added prior to, during or after the mixing step.

A better understanding of the present invention may be obtained in light of the following examples which are set forth to illustrate, but are not to be construed to limit the present invention.

EXAMPLES 1 TO 8 AND COMPARATIVE EXAMPLES 1 TO 3

In these examples and comparative examples, the dielectric and sintering properties of the base composition $Ba_3Ti_4Nb_4O_{21}$—Ba(or Sr)$Nb_2O_6$ with different mole ratios between the two components were examined.

For this, dielectric compositions were prepared with various molar ratios of the components and analyzed for dielectric properties, including quality factor, temperature coefficient of resonant frequency and dielectric constant and for sintering properties, including sintering temperature and sintering density.

$BaCO_3$, $TiO_2$ and $Nb_2O_5$, all being 99.99% or higher in purity, were weighed and mixed together at a molar ratio of 3:4:2. In a polyethylene vessel, water was combined at a weight ratio of 1:1 with the mixture of $BaCO_3$, $TiO_2$ and $Nb_2O_5$ in the molar ratio of 3:4:2. A dispersing agent was added to smoothly combine the starting materials. Separately, a mixture of $BaCO_3$ or $SrCO_3$ and $Nb_2O_5$ and either $BaNb_2O_6$ or $SrNb_2O_6$ in a molar ratio of 1:1 was combined in the same manner. The two samples were kneaded for 24 hours in ball mills using an yttria-stabilized zirconia ball.

The resulting mixed slurries were demoisturized by heating at 100° C. in an oven, followed by calcination at 1,100° C. for 2 hours in an alumina crucible. The calcined powders were combined at predetermined ratios and milled for 24 hours in the same manner as above.

As a binder, polyvinyl alcohol was added in an amount of 1 part by weight to each of the milled slurries which were then coarsely granulized. Under a pressure of 1,000 kg/cm$^2$, the granules were molded into cylinders, each being 10 mm in diameter with a height of 4–5 mm. The cylinders were sintered at 1,200–1,300° C. in an air atmosphere with the temperature being elevated at a rate of 5° C./min. After sintering, the cooling of the cylinders was conducted within the furnace. The bulk density of sintered samples was determined by the Archimedes' method. (see. J. S. Reed, in Introduction to the *Principles of Ceramic Processing*, Wiley, Singapore (1989), pp. 108–110)

For dielectric characteristics in GHz frequency bands, each sinter sample was measured using a Hewlett Packard HP8720C network analyzer in the frequency range of 6–9 GHz. The quality factor (Q×f) was measured by the transmission cavity method using a Cu cavity and a Teflon supporter. (see. D. Kaifez and P. Guillion, *Dielectric resonators*, Artech House, Norwood, Mass., 1986, pp. 327–376) The relative dielectric constant ($\epsilon_r$) was measured using the post resonator method and the temperature coefficient of the resonant frequency ($\tau_f$) was measured using an Invar cavity in the temperature range of 20 to 80° C. (see. "A dielectric resonator method of measuring inductive capacities in the millimeter range", B. W. Hakki and P. D. Coleman, *IRE Trnas. Microwave Theory & Technol*, Vol. 8 (1960), pp. 402–410, and "Precise measurement method for temperature coefficient of microwave dielectric resonator material", T. Nishikawa, K. Wakino, H. Tamura, H. Tanaka, and Y. Ishikawa, *IEEE MTT-S Digest*, Vol. 3 (1987), pp. 277–280).

Summarized in Table 1, below, are the sintering and dielectric properties of $Ba_3Ti_4Nb_4O_{21}$—Ba(or Sr)$Nb_2O_6$ compositions sintered within the range of 1,250–1,350° C.

With various combinations of these two control compositions, the $Ba_3Ti_4Nb_4O_{21}$—$BaNb_2O_6$ composition can be modulated in temperature coefficient of resonant frequency from negative to positive values and vice versa. For example, when the $BaNb_2O_6$ moiety has a mole fraction of 0.7, the resulting $Ba_3Ti_4Nb_4O_{21}$—$BaNb_2O_6$ composition has a temperature coefficient of resonant frequency of as small as 2 ppm/° C. while maintaining the dielectric constant at as high as 55, as demonstrated in Example 3.

Like $BaNb_2O6$, $SrNb_2O_6$ alone has a negative temperature coefficient of resonant frequency and can be used to modulate the temperature coefficient of resonant frequency of $Ba_3Ti_4Nb_4O_{21}$. For instance, Example 6 is of the composition $0.5Ba_3Ti_4Nb_4O_{21}$-$0.5SrNb_2O_6$ which has a temperature coefficient of resonant frequency of −3 ppm/° C. while being improved in dielectric constant to 68.

To meet the requirements as the electronic parts, appropriate selections on the composition ratio between $Ba_3Ti_4Nb_4O_{21}$ and $BaNb_2O_6$ or $SrNb_2O_6$ can be made to modulate dielectric properties.

EXAMPLES 9 TO 19

In these examples, the influence of additives on the sintering and dielectric properties of $Ba_3Ti_4Nb_4O_{21}$—$BaNb_2O_6$-based compositions will be explained.

TABLE 1

| Exmp. No. | X (mol fraction) | Sintering Temp. (° C.) | Sintering Density (g/□) | Quality factor (Q×f) | Dielec. Const. ($\epsilon_r$) | Temp. Coeffi. of Resonant Freq. ($T_f$, $10^{-6}$/° C.) |
|---|---|---|---|---|---|---|
| Sintering and Dielectric Properties of (1-x) $Ba_3Ti_4Nb_4O_{21}$-x$BaNb_2O_6$ ||||||| 
| C.1 | 0 | 1350 | 5.10 | 18900 | 65 | 74 |
| C.2 | 1 | 1300 | 5.40 | 30000 | 30 | −50 |
| 1 | 0.15 | 1250 | 5.16 | 4800 | 64 | 63 |
| 2 | 0.5 | 1250 | 5.24 | 2900 | 57 | 59 |
| 3 | 0.7 | 1250 | 5.24 | 2500 | 55 | 3 |
| 4 | 0.8 | 1250 | 5.33 | 1900 | 50 | −130 |
| Sintering and Dielectric Properties of (1-x) $Ba_3Ti_4Nb_4O_{21}$-x$SrNb_2O_6$ |||||||
| C.3 | 1 | 1250 | 5.05 | 2000 | 27 | −232 |
| 5 | 0.15 | 1250 | 5.10 | 2700 | 65 | 55 |
| 6 | 0.5 | 1250 | 5.12 | 1500 | 68 | −3 |
| 7 | 0.7 | 1300 | 5.06 | — | — | — |
| 8 | 0.8 | 1300 | 4.96 | — | — | — |

As seen in Comparative Example 1, the composition $Ba_3Ti_4Nb_4O_{21}$ alone can be sintered at 1,350° C. and show a quality factor of approximately 18,900 with a dielectric constant of as large as 65, but its temperature coefficient of resonant frequency amounts to plus 74 ppm/° C., endowing the composition with microwave properties. On the other hand, the composition $BaNb_2O_6$ alone (Comparative Example 2) has a dielectric constant of as small as 30 and a temperature coefficient of resonant frequency of −50 ppm/° C., as seen in Comparative Example 2.

As a sintering aid, an oxide selected from the group consisting of $B_2O_3$, CuO, and ZnO was added in an amount of 1–7 parts by weight. Alternatively, an additive selected from $V_2O_5$, $SnO_2$, MgO, NiO, $Sb_2O_3$, $Bi_2O_3$, and $Ag_2O$ was used. The preparation of dielectric ceramic compositions was carried out by following the procedure as described in Examples 1 to 8. In Table 2, below, there are given sintering and dielectric properties of dielectric compositions in which $Ba_3Ti_4Nb_4O_{21}$ was mixed with either $BaNb_2O_6$ in a molar ratio of 3:7, or $SrNb_2O_6$ in a molar ratio of 5:5, along with various additives shown in Table 2 in an amount of 1–5 parts by weight.

TABLE 2

| Exmp. No. | Additive (wt %) | | | | | | | | | | Sinter Temp. (° C.) | Sinter Density (g/□) | Qual. fac. Qxf | Dielec. Const. ($\epsilon_r$) | Temp. Coeffi. Of Resonant Freq. ($T_f$, $10^{-6}$/° C.) |
|---|---|---|---|---|---|---|---|---|---|---|---|---|---|---|---|
| | $B_2O_3$ | ZnO | CuO | $V_2O_5$ | $Sb_2O_3$ | $SnO_2$ | MgO | NiO | $Bi_2O_3$ | $Ag_2O$ | | | | | |
| Sintering and Dielectric Properties of $0.3Ba_3Ti_4Nb_4O_{21}$-$0.7BaNb_2O_6$ | | | | | | | | | | | | | | | |
| 9 | 1 | — | — | — | — | — | — | — | — | — | 1000 | 5.25 | 5900 | 55 | −5 |
| 10 | 1 | 3 | — | — | — | — | — | — | — | — | 875 | 5.16 | 6900 | 53 | −1 |
| 11 | 1 | — | 5 | — | — | — | — | — | — | — | 875 | 5.19 | 5500 | 54 | −3 |
| 12 | 1 | — | — | 3 | — | — | — | — | — | — | 875 | 5.17 | 5000 | 45 | −157 |
| 13 | 1 | — | — | — | 1 | — | — | — | — | — | 950 | 5.09 | 4900 | 51 | −74 |
| 14 | 1 | — | — | — | — | 1 | — | — | — | — | 1000 | 5.25 | 5900 | 55 | +4 |
| 15 | 1 | — | — | — | — | — | 1 | — | — | — | 950 | 5.11 | 11000 | 53 | −10 |
| 16 | 1 | — | — | — | — | — | — | 1 | — | — | 950 | 5.10 | 7200 | 53 | −55 |
| 17 | 1 | — | — | — | — | — | — | — | 1 | — | 950 | 5.06 | — | — | — |
| 18 | 1 | — | — | — | — | — | — | — | — | 1 | 950 | 5.09 | — | — | — |
| Sintering and Dielectric Properties of $0.5Ba_3Ti_4Nb_4O_{21}$-$0.5SrNb_2O_6$ | | | | | | | | | | | | | | | |
| 10 | 1 | 3 | — | — | — | — | — | — | — | — | 900 | 5.12 | 4500 | 59 | −5 |
| 11 | 1 | — | 5 | — | — | — | — | — | — | — | 900 | 5.13 | 3600 | 60 | −7 |
| 12 | 1 | — | — | 3 | — | — | — | — | — | — | 900 | 5.11 | 2200 | 58 | −13 |
| 13 | 1 | — | — | — | 1 | — | — | — | — | — | 1000 | 5.15 | — | — | — |
| 14 | 1 | — | — | — | — | 1 | — | — | — | — | 1000 | 5.10 | — | — | — |
| 15 | 1 | — | — | — | — | — | 1 | — | — | — | 1000 | 5.11 | 6500 | 57 | −1 |
| 19 | 1 | — | — | — | — | — | — | 1- | — | — | 950 | 5.09 | 5000 | 58 | −6 |

As apparent from Table 2, the addition of a sintering aid or an additive can bring about a great reduction in sintering temperatures of $Ba_3Ti_4Nb4O_{21}$—$BaNb_2O_6$-based compositions. Of the oxides used, the sintering aids, i.e., $B_2O_3$, ZnO and CuO, have the greatest influence on the sintering temperature. In addition, these sintering aids act to improve the quality factor of the base compositions. Oxides $V_2O_5$, $SnO_2$, MgO, NiO, $Sb_2O_3$, $Bi_2O_3$ and $Ag_2O$ were also observed to have the effect of reducing the sintering temperature.

The presence of such a sintering aid or an additive enables the sintering of the $Ba_3Ti_4Nb_4O_{21}$—$BaNb_2O_6$-based compositions to be conducted at 1,000° C. or lower, thus making it possible to recruit low-temperature melting electrodes, such as Ag, Cu, Ag/Pd and the like, into multilayer type elements.

As proven with a dielectric constant of 53–68 and a quality factor of at least 5,000, the $Ba_3Ti_4Nb_4O_{21}$—$BaNb_2O_6$-based compositions supplemented with the sintering aid or additive exhibit excellent dielectric properties, sufficient to be applicable to electronic elements which operate with microwaves in a GHz band. For instance, when chip type parts, such as chip LC filters, chip duplexers, planar antenna, planar filters, MCM, substrates and the like, are prepared from the compositions, they can be miniaturized, as they show low dielectric loss with large dielectric constants. Also, the compositions can be applied for the fabrication of temperature-stable capacitors (NPO MLCC) because they make great contributions to reduce the temperature coefficient of resonant frequency.

Consequently, the $Ba_3Ti_4Nb_4O_{21}$—$BaNb_2O_6$-based compositions supplemented with sintering aids or additives have excellent sintering properties enough to sinter low-melting point electrodes, together therewith as well as excellent dielectric properties suitable for use in multilayer type parts for high frequencies such as microwaves.

EXAMPLES 20 TO 29

$BaCO_3$, $SrCO_3$, $CaCO_3$, $TiO_2$, $SnO_2$, $ZrO_2$, $Nb_2O_5$ and $Ta_2O_5$ were weighed such that a molar ratio of 3:4:2 ($BaCO_3$, $SrCO_3$, $CaCO_3$) : ($TiO_2$, SnO2, $ZrO_2$) : ($Nb_2O_5$, $Ta_2O_5$) was obtained. With this molar ratio, dielectric compositions were prepared in the same manner as in Examples 9–19 and analyzed for sintering and dielectric properties. The results are given in Table 3, below.

TABLE 3

Sintering & Dielectric Properties of $0.3(Ba_{3-x}A_x)(Ti_{4-y}B_y)(Nb_{4-z}C_z)O_{21}$-$0.7BaNb_2O_6$

| Exmp. No. | A(x) | | B(y) | | C(z) | Additive (wt %) | | | Sintering Temp. (° C.) | Sintering Density (g/□) | Quality factor (Qxf) | Dielec. Const. ($\epsilon_r$) | Temp. Coeffi. Of Resonant Freq. ($T_f$, $10^{-6}$/° C.) |
|---|---|---|---|---|---|---|---|---|---|---|---|---|---|
| | SrO | CaO | $SnO_2$ | $ZrO_2$ | $Ta_2O_3$ | $B_2O_3$ | ZnO | CuO | | | | | |
| 20 | 1 | — | — | — | — | 1 | 3 | — | 900 | 5.04 | — | — | — |
| 21 | — | 1 | — | — | — | 1 | 3 | — | 1000 | 4.85 | — | — | — |
| 22 | — | — | 1 | — | — | 1 | 3 | — | 900 | 5.06 | 11000 | 46 | 8 |
| 23 | — | — | 1 | — | — | 1 | — | 5 | 900 | 5.10 | 8200 | 48 | 5 |
| 24 | — | — | 2 | — | — | 1 | 3 | — | 900 | 4.98 | 7200 | 43 | 6 |
| 25 | — | — | — | 1 | — | 1 | 3 | — | 1000 | 5.21 | 2100 | 51 | 3 |
| 26 | — | — | — | — | 1 | 1 | 3 | — | 950 | 5.58 | 19000 | 45 | 2 |
| 27 | — | — | — | — | 2 | 1 | 3 | — | 1000 | 5.61 | 24000 | 41 | −1 |

TABLE 3-continued

Sintering & Dielectric Properties of $0.3(Ba_{3-x}A_x)(Ti_{4-y}B_y)(Nb_{4-z}C_z)O_{21}$-$0.7BaNb_2O_6$

| Exmp. No. | A(x) SrO | A(x) CaO | B(y) SnO₂ | B(y) ZrO₂ | C(z) Ta₂O₃ | Additive (wt %) B₂O₃ | Additive (wt %) ZnO | Additive (wt %) CuO | Sintering Temp. (°C.) | Sintering Density (g/□) | Quality factor (Qxf) | Dielec. Const. (εᵣ) | Temp. Coeffi. Of Resonant Freq. ($T_f$□$10^{-6}$/°C.) |
|---|---|---|---|---|---|---|---|---|---|---|---|---|---|
| 28 | — | — | — | — | 2 | 1 | — | 5 | 1000 | 5.65 | 17000 | 42 | −7 |
| 29 | — | — | — | — | 3 | 1 | 3 | — | 1050 | 5.60 | 18000 | 40 | −5 |

It can be seen from Table 3 that, when substituting for corresponding elements of the $Ba_3Ti_4Nb_4O_{21}$—$BaNb_2O_6$-based compositions, the cations exert great influence on their sintering and dielectric properties. Particularly, the quality factor was highly improved when Sn was partially substituted for Ti, or Ta partially for Nb. However, when such substitution was conducted with large amounts of substituents, the resulting compositions were deteriorated in quality factor and particularly in sintering properties. Meanwhile, the cation-substituted compositions were found to be greatly decreased in sintering temperature by the addition of such a sintering aid or an additive as described in the above examples.

Accordingly, dielectric properties of the $Ba_3Ti_4Nb_4O_{21}$—$BaNb_2O_6$-based compositions can be improved by appropriately selecting kinds and amounts of substituting elements.

Taken together, the data obtained in the above examples demonstrate that $Ba_3Ti_4Nb_4O_{21}$—$BaNb_2O_6$-based compositions themselves can be controlled in temperature coefficient of resonant frequency by adjusting the molar ratio of the two component moieties and that the presence of a sintering aid and/or an additive reduces the sintering temperature of the base composition to as low as 900° C., making it possible to sinter the composition together with a low-melting point electrode such as silver.

With the advantage of being large in dielectric constant with a temperature coefficient of resonant frequency within ±10 ppm/° C., the dielectric compositions of the present invention can be used where temperature stability is required like temperature-stable multilayer type capacitors (NPO MLCC). Based on a high quality factor (Qxf) of at least 5,000 in a frequency band of 7–9 GHz, the compositions can be applied to communication parts for microwaves, such as filters, oscillators, planar antenna, MCM and the like. By virtue of their small values in dielectric loss and temperature coefficient of resonant frequency, the compositions according to the present invention are particularly suitable for fabricating electronic parts for use in mobile communication, especially personal communications service (PCS). Further, since they show excellent dielectric properties in a wide composition range and their dielectric properties are nearly independent of sintering temperatures, the compositions prepared according to the present invention guarantee stable production of applied products.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A dielectric ceramic composition comprising as a main component a composition represented by $$(1-x)Ba_3Ti_4Nb_4O_{21}-(x)ANb_2O_6$$

wherein, x is a mole fraction between 0 and 1; and

A is Ba or Sr.

2. The dielectric ceramic composition as set forth in claim 1, further comprising at least one oxide selected from the group consisting of $B_2O_3$, CuO and ZnO, in an amount of 0.01–7 parts by weight, said oxide serving as a sintering aid.

3. The dielectric ceramic composition as set forth in claim 1, further comprising at least one additive selected from the group consisting of $V_2O_5$, $SnO_2$, MgO, NiO, $Sb_2O_3$, $Bi_2O3$, and $Ag_2O$, in an amount of 0.01–7 parts by weight.

4. The dielectric ceramic composition as set forth in claim 2, further comprising at least one additive selected from the group consisting of $V_2O_5$, $SnO_2$, MgO, NiO, $Sb_2O_3$, $Bi_2O3$, and $Ag_2O$, in an amount of 0.01–7 parts by weight.

5. The dielectric ceramic composition as set forth in claim 1, wherein part of the Ti element of the $Ba_3Ti_4Nb_4O_{21}$ moiety is substituted with Sn.

6. The dielectric ceramic composition as set forth in claim 5, wherein said Sn is present in an amount of 0.1–50 mol % based on total amount of Ti and Sn.

7. The dielectric ceramic composition as set forth in claim 1, wherein part of the Nb element of the $Ba_3Ti_4Nb_4O_{21}$ moiety is substituted with Ta.

8. The dielectric ceramic composition as set forth in claim 7, wherein said Ta is present in an amount of 0.1–50 mol % based on total amount of Nb and Ta.

9. The dielectric ceramic composition as set forth in claim 5, wherein part of the Nb element of the $Ba_3Ti_4Nb_4O_{21}$ moiety is substituted with Ta.

10. The dielectric ceramic composition as set forth in claim 9, wherein said Ta is present in an amount of 0.1–50 mol % based on total amount of Nb and Ta.

11. The dielectric ceramic composition as set forth in claim 2, wherein part of the Ti element of the $Ba_3Ti_4Nb_4O_{21}$ moiety is substituted with Sn.

12. The dielectric ceramic composition as set forth in claim 11, wherein said Sn is present in an amount of 0.1–50 mol % based on total amount of Ti and Sn.

13. The dielectric ceramic composition as set forth in claim 2, wherein part of the Nb element of the $Ba_3Ti_4Nb_4O_{21}$ moiety is substituted with Ta.

14. The dielectric ceramic composition as set forth in claim 13, wherein said Ta is present in an amount of 0.1–50 mol % based on total amount of Nb and Ta.

15. The dielectric ceramic composition as set forth in claim 11, wherein part of the Nb element of the $Ba_3Ti_4Nb_4O_{21}$ moiety is substituted with Ta.

16. The dielectric ceramic composition as set forth in claim 15, wherein said Ta is present in an amount of 0.1–50 mol % based on total amount of Nb and Ta.

17. A method for manufacturing a dielectric ceramic, comprising the steps of:

mixing oxide powders to give a composition mainly composed of $(1-x)Ba_3Ti_4Nb_4O_{21}-(x)ANb_2O_6$ wherein, x is a mole fraction between 0 and 1; and A is Ba or Sr, drying and calcining the composition;

milling the composition;

molding thus milled composition to give a molded body; and sintering the molded body.

18. The method as set forth in claim 17, wherein said composition further comprises at least one sintering aid selected from the group consisting of $B_2O_3$, CuO and ZnO.

19. The method as set forth in claim 18, wherein the sintering step is conducted in the range of 900–1,000° C.

20. The method as set forth in claim 17, wherein said composition further comprises at least one additive selected from the group consisting of $V_2O_5$, $SnO_2$, MgO, NiO, $Sb_2O_3$, $Bi_2O_3$, and $Ag_2O$.

21. The method as set forth in claim 17, wherein the molding step is carried out in the presence of a binder.

* * * * *